(12) United States Patent
Miyamura et al.

(10) Patent No.: US 11,442,659 B2
(45) Date of Patent: Sep. 13, 2022

(54) READING SEQUENTIALLY STORED FILES BASED ON READ AHEAD GROUPS

(71) Applicant: INTERNATIONAL BUSINESS MACHINES CORPORATION, Armonk, NY (US)

(72) Inventors: Tsuyoshi Miyamura, Yokohama (CN); Hiroshi Itagaki, Yokohama (JP); Shinsuke Mitsuma, Machida (JP); Tohru Hasegawa, Tokyo (JP); Noriko Yamamoto, Tokyo (JP); Sosuke Matsui, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 492 days.

(21) Appl. No.: 16/689,127

(22) Filed: Nov. 20, 2019

(65) Prior Publication Data

US 2021/0149590 A1 May 20, 2021

(51) Int. Cl.
*G06F 12/00* (2006.01)
*G06F 3/06* (2006.01)

(52) U.S. Cl.
CPC .......... *G06F 3/0656* (2013.01); *G06F 3/0611* (2013.01); *G06F 3/0659* (2013.01); *G06F 3/0682* (2013.01)

(58) Field of Classification Search
CPC .... G06F 3/0656; G06F 3/0611; G06F 3/0659; G06F 3/0682
See application file for complete search history.

(56) References Cited

U.S. PATENT DOCUMENTS

| 6,026,468 A * | 2/2000 | Mase ................ G11B 27/3027 711/111 |
| 7,386,674 B1 * | 6/2008 | Lango .................. G06F 3/0659 711/158 |
| 8,069,270 B1 * | 11/2011 | Nambiar ............. H04L 12/6418 712/237 |
| 9,189,162 B2 | 11/2015 | Butt |
| 9,262,081 B2 * | 2/2016 | Ashida .................. G06F 3/0611 |

(Continued)

FOREIGN PATENT DOCUMENTS

| JP | 2014546678 A | 11/2012 |
| JP | 2013131185 A | 6/2013 |
| JP | 2013231072 A | 11/2013 |

*Primary Examiner* — David Yi
*Assistant Examiner* — Tahilba O Puche
(74) *Attorney, Agent, or Firm* — Anthony Curro

(57) ABSTRACT

A plurality of files are stored on magnetic tape having at least one wrap for storing data sets. Each data set includes one or more records. A number of data sets that will remain in a buffer memory after performing a read ahead operation is determined. A number of records that are likely to remain in the buffer memory after performing a read ahead operation is determined. For each record likely to remain in the buffer memory after performing a read ahead operation, positions of the records on the magnetic tape are determined. Each file of the plurality of files are classified into one group of a plurality of groups based on a position of a record corresponding with each respective file and the number of records that are likely to remain in the buffer memory after performing a read ahead operation.

20 Claims, 11 Drawing Sheets

(56) References Cited

U.S. PATENT DOCUMENTS

| | | |
|---|---|---|
| 9,343,111 B2 | 5/2016 | Katagiri |
| 9,619,147 B2 | 4/2017 | Katagiri |
| 2004/0162939 A1* | 8/2004 | Bartlett .................. G11B 5/584 |
| 2004/0243760 A1* | 12/2004 | Dahman ............. G11B 5/00813 |
| 2014/0063634 A1* | 3/2014 | Butt .......................... G11B 5/09 |
| 2019/0163376 A1 | 5/2019 | Abe |

* cited by examiner

READING SEQUENTIALLY STORED FILES BASED ON READ AHEAD GROUPS

BACKGROUND

The present disclosure relates to data storage systems, and more particularly to reading multiple files stored on tape media with improved speed.

In a data storage system, a tape drive may be used to store data on magnetic tape media. As one example, a magnetic tape may be housed in a cartridge and have a length of about 1000 meters. The magnetic tape may have multiple tracks for storing data. The tape drive reads and writes data on the tape surface. Data is stored sequentially along the tracks of the tape in units called records. Each time the tape drive needs to read a record, the tape drive needs to locate the position of the record on the magnetic tape. As such, a tape drive may be referred to as a sequential access device. Access time depends on the time it takes to move the tape to the position where the data is stored. As one example, tape speed in a locate operation is 12 m/s. Accordingly, it may take up to about 85 seconds to move the tape to the general position where the data is stored and a further several seconds to move the tape into a precise position for reading.

Linear Tape File System (LTFS) is a file system that may be serve as an interface between a process running on a computer, e.g., an application program, and a tape drive. LFTS allows data stored on magnetic tape to be accessed in a similar manner to data stored on other types of memory, e.g., a disk or flash drive.

SUMMARY

Various embodiments are directed to a method for reading a plurality of files stored on a magnetic tape having at least one wrap for storing one or more data sets, each data set including one or more records. The method may include: determining a number of data sets that will remain in a buffer memory after performing a read ahead operation and determining a number of records that are likely to remain in the buffer memory after performing a read ahead operation. For each record likely to remain in the buffer memory after performing a read ahead operation, the method may include determining positions of the records on the magnetic tape. In addition, the method may include classifying each file of the plurality of files into one group of a plurality of groups based on a position of a record corresponding with each respective file and the number of records that are likely to remain in the buffer memory after performing a read ahead operation.

In an embodiment, the determining a number of records that are likely to remain in the buffer memory after performing a read ahead operation may include: calculating an average of the number of records per data set for a plurality of data sets; selecting a minimum average number of records per data set, wherein the minimum average number is a minimum of the average of the number of records per data set for the plurality of data sets; and multiplying the minimum average number of records per data set by the number of data sets determined to remain in the buffer memory after performing a read ahead operation by the determined number of data sets that will remain in a buffer memory after performing a read ahead operation.

In an embodiment, the classifying each file of the plurality of files into one group of a plurality of groups based on a position of a record corresponding with each respective file and the number of records that are likely to remain in the buffer memory after performing a read ahead operation further comprises: for each record likely to remain in the buffer memory after performing a read ahead operation, determining the positions of the records on the magnetic tape: obtaining a quotient by dividing the determined record position of the file by the determined number of records that are likely to remain in the buffer memory after performing a read ahead operation; and classifying the file into a group based on the quotient.

In an embodiment, the method may include storing a plurality of data sets in the buffer memory during a read ahead operation.

In an embodiment, the method may include storing a plurality of data sets in the buffer memory during a read ahead operation.

In an embodiment, the method may include: performing, subsequent to the classifying each file of the plurality of files into one group of a plurality of groups, a locate operation to reposition a head of a tape drive to a position where a first group to which a first file of the plurality of files is assigned and reading out records of a number of records of the first group; and moving, subsequent to the performing of the locate operation, the head of the tape drive on the tape to read records of a number of records to be read ahead for storage in the buffer memory.

In an embodiment, the method may include obtaining a number of divisions per wrap from a tape directory.

In an embodiment, the method may include reading out one or more files included in the first group in an arbitrary order.

In addition, various embodiments are directed to a computer program product for reading a plurality of files stored on a magnetic tape having at least one wrap for storing one or more data sets, each data set including one or more records, the computer program product comprising one or more computer readable storage media, and program instructions collectively stored on the one or more computer readable storage media, the program instructions executable by processing logic in a tape library to cause the tape library to perform one or more aspects of the foregoing methods.

Further, various embodiments are directed to a tape library system configured for reading a plurality of files stored on a magnetic tape having at least one wrap for storing one or more data sets, each data set including one or more more records.

The above summary is not intended to describe each illustrated embodiment or every implementation of the present disclosure.

Figure 1:
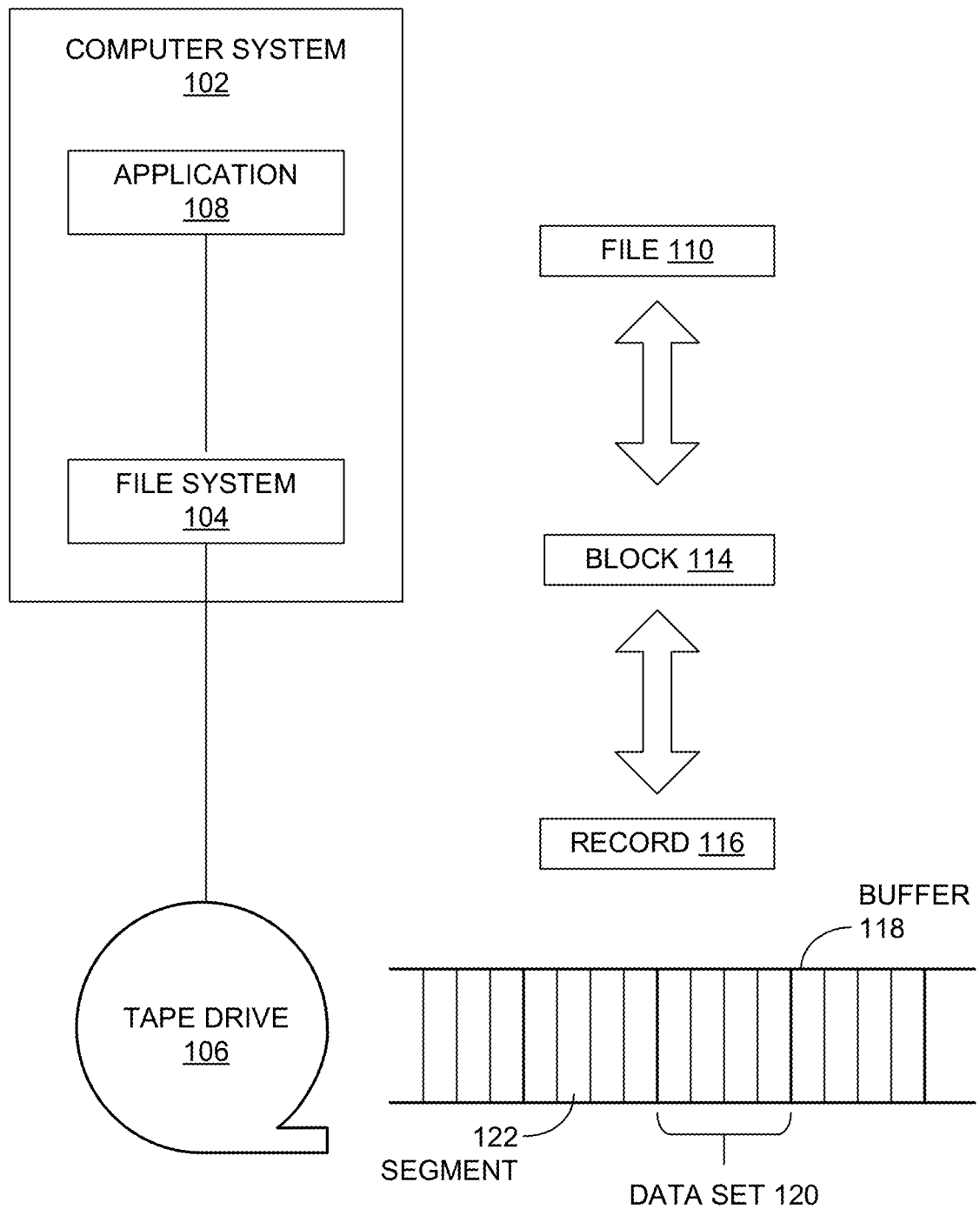
FIG. 1 illustrates computer system, a file system, a tape drive, and various other components in which various embodiments may be implemented.

The same numbers may be used in the Figures and the Detailed Description to refer to the same devices, parts, components, steps, operations, and the like. While the concepts and embodiments described in this disclosure are amenable to various modifications and alternative forms, specifics thereof have been shown by way of example in the drawings and will be described in detail. It should be understood, however, that the intention is not to limit the claims to the particular embodiments described. On the contrary, the intention is to cover all modifications, equivalents, and alternatives falling within the spirit and scope of the invention.

DETAILED DESCRIPTION

According to various embodiments, a method, system, and computer program product provide for reading multiple files from a sequential storage media utilizing the read-ahead function of a tape drive. A first aspect performs a classifying operation. The number of records that are likely to remain in a buffer of the tape drive without being overwritten by one read-ahead operation are calculated. Files are classified into groups on the basis of the number of likely remaining records. A second aspect performs a copying operation on a set of files. Multiple files are read from the buffer in an arbitrary order without moving the tape. Advantages of the various embodiments may include faster copy operations. Specifically, multiple files may be copied in a shorter amount of time as compared with a copy operation in which the multiple files are sorted (in advance of reading the files from the tape) into an order corresponding with the position of the files on the tape.

FIG. 1 illustrates computer system 102, a file system 104, a tape drive 106, and various other components according to various embodiments. FIG. 1 illustrates the transfer of a file 110 from an application program 108 to the tape drive 106 via the file system 104. The computer system 102 may be any type of computer system 102 that has a need to store or retrieve data from a sequential storage device. For example, the computer system 102 may be server or a host on which the application program 108 runs. The computer system 102 or the application program 108, or both collectively, may be referred to herein simply as a "host." The application program 108 may write data to or read data from the tape drive 106 in units called files. The application 108 uses an API of the file system 104 to read files requested by a user. One commercial example of a tape drive 106 that can be used in various embodiments is an IBM TS1155 tape drive.

According to various embodiments, the file system 104 may be a Linear Tape File System (LTFS). The file system 104 is depicted as running on a computer system 112, which may be part of a data storage system or library having a multiple tape drives. However, in other embodiments the file system 104 may run on computer system 102. The LFTS allows data stored on magnetic tape to be accessed by the application program in a similar manner to data stored on other types of memory, e.g., a disk or flash drive. The LTFS manages files in units called blocks. An exemplary block 114 is shown in the Figure. The LTFS records metadata on the tape. The metadata includes a record number for each file. The record number corresponds with the position of the file on the tape.

The tape drive 106 writes data to and reads data from magnetic tape media (not shown). The magnetic tape typically has multiple tracks for storing data. Data is stored sequentially along the tracks of the tape in units called records. An exemplary record 116 is shown in the Figure. The file system 104 writes and reads data (records) to and from the tape drive 106. The file system 104 is designed so that a record 116 and a block 114 are the same size.

Records to be transferred to the tape drive may be compressed and/or encrypted, and embedded with necessary control codes, and an error correction code per unit called a data set may be added. The records along with the added information may then written onto the tape. An exemplary data set 120 is shown in the Figure. The tape drive has a buffer 118 used when reading and writing data from and to a tape. As one example, the size of the buffer 118 in an IBM TS1155 tape drive is 2 GB. The buffer 118 is managed in units called segments defined by segmenting the buffer with the size of a data set. An exemplary segment 122 is shown in the Figure.

Figure 2:
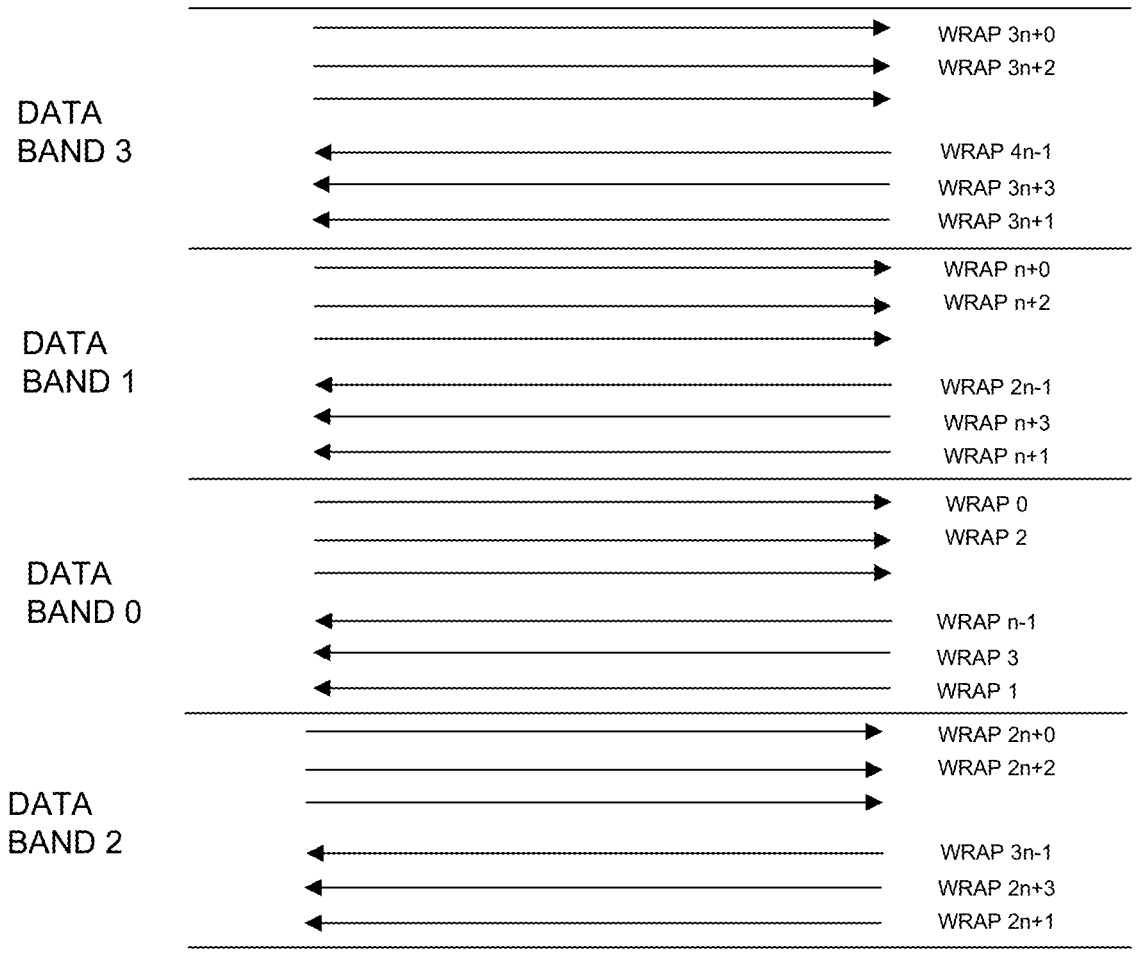
FIG. 2 illustrates a layout of data tracks on a tape medium according to various embodiments.

FIG. 2 illustrates a layout of data tracks on a tape medium according to various embodiments. A tape medium, e.g., magnetic tape, has a vertical direction (width) and horizontal direction (length). The tape medium is divided into multiple wraps in the vertical direction (width). A drive writes data linearly from the beginning of the tape (BOT) to the end of the tape (EOT) in a forward horizontal direction on even wraps, and then writes data linearly from EOT to BOT in a backward horizontal direction on odd wraps as shown in FIG. 2. The width of each wrap is called the track pitch.

A tape directory is information that indicates, in detail, the locations of data on a tape. This information may be stored at a specified area on the tape, e.g., the information may be written at the time of cartridge unloading, and read out at the time of cartridge loading. The tape drive searches for the data stored on the tape on the basis of this location information.

The IBM TS1155 tape drive divides one (1) wrap into 128 divisions and records the record number of the last record in each division in the beginning area of the tape. The IBM TS1130/TS1140 tape drive divides a wrap into 64 divisions. The tape directory stored on tape by these tape drives is referred to as a High Resolution Tape Directory (HRTD). To improve the speed of locate operations on the tape, the IBM TS1155 tape drive reads the record numbers of the last records in each division when loading the tape. As the total length of a tape is about 1000 meters, one division has a length of 7.8 meters. It takes about 8 cm to write one data set, which is the minimum unit of the data to be recorded by the tape drive. As one segment records one data set, 97 (=7.8 m/8 cm) segments in the buffer 118 can store the data of one HRTD division.

Figure 3A:
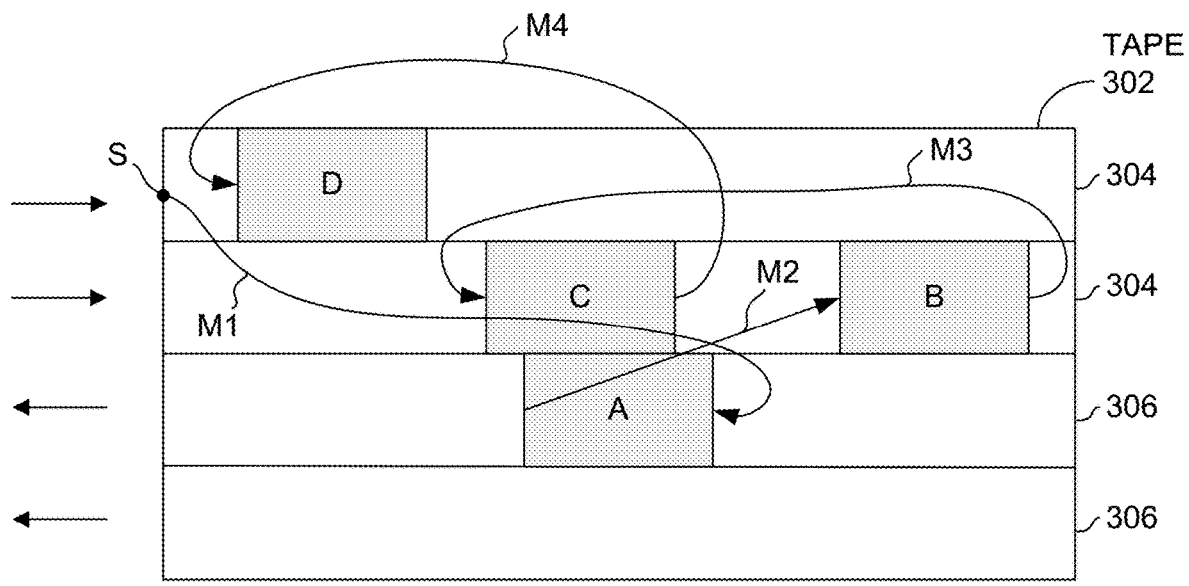
FIGS. 3A and 3B illustrate reading files on a tape medium in an arbitrary order and in a sorted order.
Figure 3B:
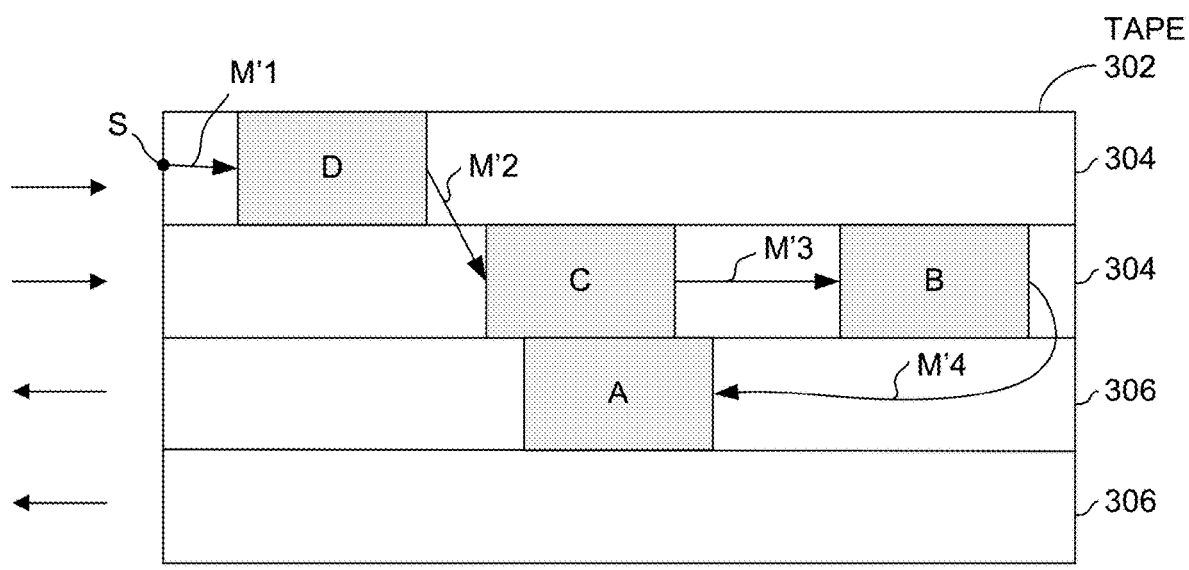

FIGS. 3A and 3B illustrate simplified examples of reading multiple files from a tape. FIGS. 3A and 3B show a tape 302 having two forward wraps 304 and two backward wraps 306. The starting and ending locations of four files on the tape are depicted by blocks A, B, C, and D. In this simplified example, the application 108 issues a request to copy a set of files, the set comprising files A, B, C, and D. It should be appreciated that, in practice, a request to copy a set of files may include many more than four files. It should also be appreciated that, in practice, a plurality files may be distributed along the length of the tape, e.g., 1,000 meters, on various tracks in forward and backward wraps. For the examples shown in FIGS. 3A and 3B, a starting position S for a tape head is assumed. The arrows M1, M2, M3, M4, M'1, M'2, M'3, and M'4 illustrate how the tape head is moved in order to read the various files in the set of files.

FIG. 3A illustrates reading files A, B, C, D in an order specified in the copy request. Assume the file copy request from the application 108 specifies the set of files in the order: A, B, C, D. The tape head first moves from starting position S to read file A, as shown by M1. The tape head next moves to read file B, as shown by M2. The tape head next moves to read file C, as shown by M3. Finally, the tape head moves to read file D, as shown by M4. It can be seen that the tape head move distances are not insignificant. As the number of files to be located increases, the total of move distances becomes very large.

FIG. 3B illustrates the move paths when the order of the files is sorted in advance in the order of the starting positions of the files. Before copying the files, the set of files in the initial order (A, B, C, D) are sorted into an order corresponding with the position of the files on the tape: D, C, B, A. As shown in FIG. 3B, the tape head first moves from starting position S to read file C, as shown by M'1. The tape head next moves to read file C, as shown by M'2. The tape head next moves to read file B, as shown by M'3. Finally, the tape head moves to read file A, as shown by M'4. It can be seen that the tape head move distances are much reduced as compared with FIG. 3A.

The sorting by block positions is typically performed by the computer system 102, though it may be performed by the computer system 112 in some embodiments. The sorting requires a calculation amount of the order of O(N log N), even using an algorithm like quicksort. Thus, as the number of files to be copied increases, the computation time for sorting rapidly increases.

To illustrate the problem caused by the need to sort a large number files, consider the following example. An IBM TS1155 tape drive is capable of recording a maximum of 15 TB of uncompressed data on one tape. Therefore, a very large number of files can be recorded on one tape. For example, when the average size of files recorded in an LTFS is 10 MB, a 15 TB tape can record 1.5 million files. The inventors have observed in one test that sorting approximately 1 million files recorded on tape by a TS1155 tape drive required 24 hours. Thus, a request to copy 1 million files recorded on a tape to a hard disk drive could require 24 hours or more just for the sorting operation.

The demand to copy whole files in a tape is very common when many files in the tape are edited or removed because erased data won't be reused to store other data as the tape drive is a sequential device. Files must be reordered by their positions on the tape otherwise unnecessary locate (tape movement) operations require a very long time. Further, a sorting operation requires a calculation amount of the order of O(N log N), which can require a very long time when the number of files is large, e.g., 24 hours to sort 1,000,000 files.

Accordingly, there is a need to reduce the time required for sorting multiple files specified in a read request. Before describing the novel solution for reducing the time required for sorting multiple files specified in a read request, a "read ahead" function of a tape drive is first described.

Referring again to FIG. 1, a buffer 118 associated with tape drive 106 is shown. The buffer 118 is used in the read ahead function. Upon receiving a read request (or a Locate command), the tape drive first reads the requested data set at the target position, i.e., at the position on the tape where the requested data set is stored. After reading the requested data set, the read head continues to read data that is stored on the tape after the target position, i.e., the read head thus "reads ahead." As data is read by the tape drive, it is stored in the buffer 118. The requested data set is stored in the buffer. The "read ahead" data (that was not requested) is also stored in the buffer. After reading the requested data set, the read head continues to read data that is stored on the tape after the target position until the buffer 118 reaches a particular or predefined level of fullness. In one embodiment, data is read ahead until the buffer 118 becomes almost full, e.g., 95%.

The "read ahead" data stored in the buffer 118 may be used when a subsequent read (or Locate) operation is performed. When a subsequent request is received, the tape drive checks the buffer 118 and if the requested data is in the buffer, the tape drive extracts the record from the buffer without moving the tape to a target position and repositioning the tape head at the target position. Therefore, by reading ahead data and storing the read ahead data in the buffer, the tape drive can immediately send the requested data to the host.

As mentioned above, the read head continues to read data that is stored on the tape after a target position until the buffer 118 reaches a particular or predefined level of fullness. The read ahead function takes into account the quantity of valid data in the buffer 118 that may be requested. When there is data remaining in the buffer 118, the number of segments to be read ahead from the tape is reduced so that the data remaining in the buffer can be used for as long as possible. A Read Position command can be used to get information about the "from record" and the "up to record," i.e., the range of records, that have been stored in the buffer 118.

A further description of the read-ahead mechanism with reference to a specific example follows.

Figure 4:
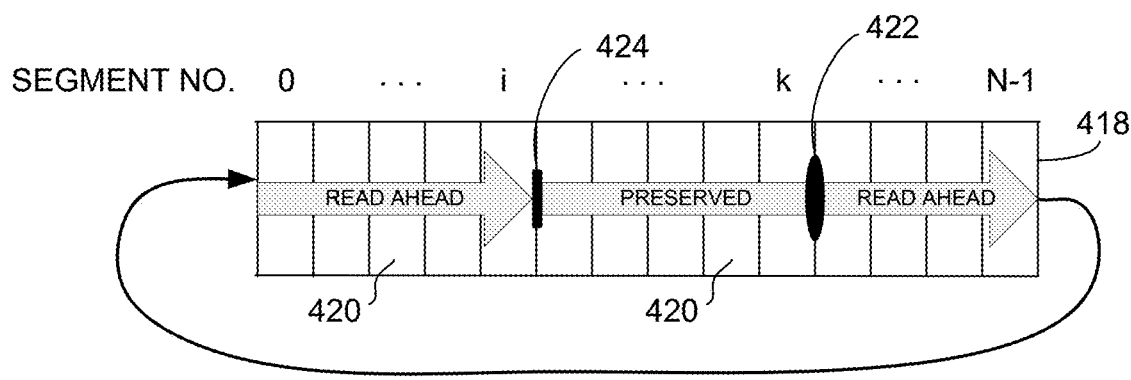
FIG. 4 illustrates an example buffer that has been divided into segments.

FIG. 4 illustrates an example buffer 418 that has been divided into 14 segments 420. The buffer 418 may be a ring buffer. The tape drive stores data sets read from the tape to the segments 420 of the buffer 418, one by one, in such a manner that one data set is stored in one segment. The ellipse 422 in FIG. 4 indicates the position in the buffer where the data sets read from the record specified in a Locate command are saved. The rectangle 424 in FIG. 4 indicates the position in the buffer where the first one of the data sets read by the read-ahead operation is saved. When a Locate command is requested to move to a record, the tape drive moves the head (and tape) to the position of the record on the tape specified in the Locate command (which corresponds with segment k in the buffer in FIG. 4), and then reads data sets from the tape located after the position specified in the Locate command (i.e., from positions on the tape corresponding with segment k to segment N−1, and from segment 0 to segment i) and saves them in the buffer in preparation for possible use in subsequent read operations.

When the tape drive has moved the head (and tape) in response to a new Locate command and data that has been previously read remains in the buffer, the buffer will store the data from the target data set (specified by the new Locate command) up to the data set to which the read-ahead operation has read. This is in addition to the previously saved remaining data.

Figure 5A:
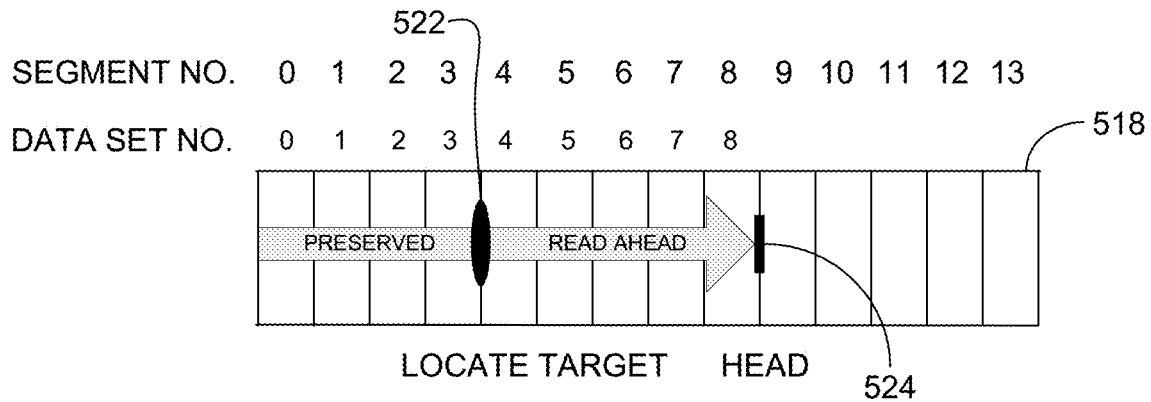
FIGS. 5A-C illustrate an example buffer in various states of in an example read-ahead operation.
Figure 5B:
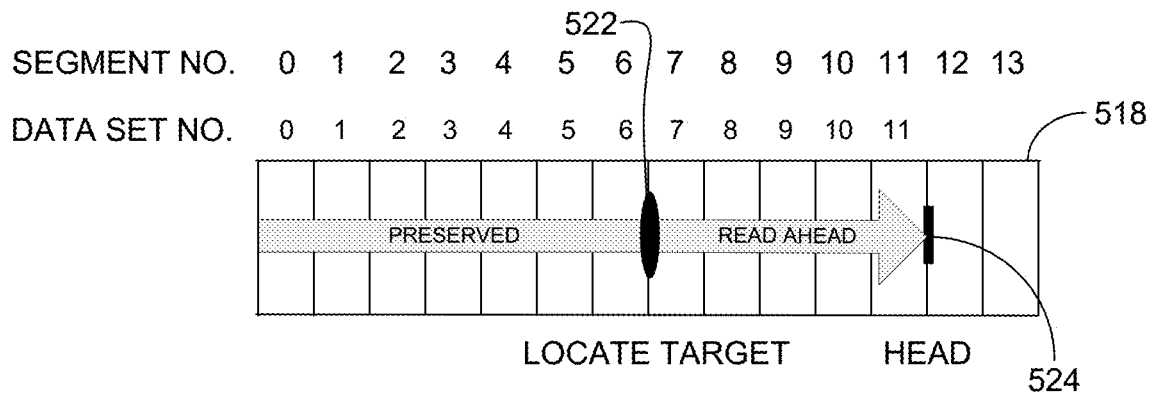
Figure 5C:
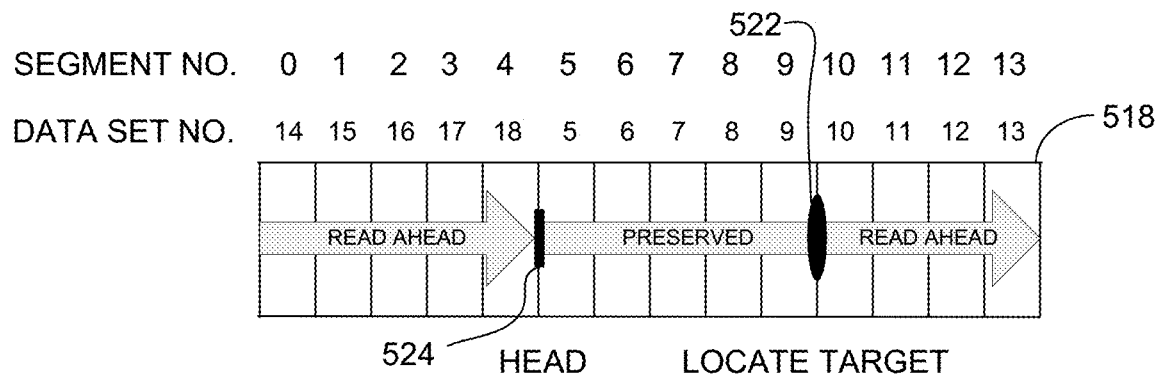

FIGS. 5A-C illustrate an example buffer 518 that has been divided into 14 segments 520, similar to the buffer 418 depicted in FIG. 4. The ellipse 522 indicates the position in the buffer where the data sets read from the record specified in a Locate command are saved. The rectangle 524 indicates the position in the buffer where the first one of the data sets read by the read-ahead operation is saved.

FIG. 5A illustrates a state where the tape drive has moved the head originally positioned at an initial segment to the target record located at segment 3. In this process, the tape drive reads data sets 0 to 3 stored on the tape. The tape drive stores the data sets in segments 0 to 3 of the buffer 518. The tape drive then reads ahead the data sets 4 to 8 stored on the tape. The tape drive stores the data sets to the divisions of the segments 4 to 8 of the buffer. After the read-ahead operation, the head is at the last position of the data set 8, which is indicated by the rectangle 524 in FIG. 5A.

When the LTFS issues a Locate request to locate the position of a record included in the data sets 0 to 3 and issues a Read request, the tape drive can return the record from the segments 0 to 3 in the buffer without moving the tape. In addition, when the LTFS subsequently issues a Locate request to locate the position of a record included in the data sets 4 to 8 and issues a Read request, the tape drive can immediately return the record without moving the tape. Additionally, the tape drive performs a read-ahead operation asynchronously with the transfer of data sets 4 to 8 to the host in preparation for succeeding read out operations.

For example, referring now to FIG. 5B, when a Locate operation is performed to locate the position of a record stored in the data set 6 and a Read operation is performed, the tape drive immediately transfers the specified record from segment 6 of the buffer 518 to the requestor. The tape drive then performs a read-ahead operation to read up to data set 11 and stores data sets 7 to 11 in the segments 7 to 11 of the buffer 518 asynchronously with the transfer of the specified record from segment 6. In this state, when the LTFS issues a Locate request to locate the position of a record included in the data sets 0 to 6 and issues a Read request for the record, the tape drive transfers the specified record from the buffer to the host without moving the tape. In addition, when the LTFS issues a Locate request to locate the position of a record included in the data sets 7 to 11 and issues a Read request for the record, the tape drive immediately returns the record from the buffer 518 to the host without moving the tape. Additionally, the tape drive performs a read-ahead operation asynchronously with the data transfer to the host by moving the tape in preparation for succeeding read out operations.

For example, referring now to FIG. 5C, when a Locate operation is performed to locate the position of a record included in the data set 9 and a read operation is performed, the tape drive immediately transfers the specified record from the segment 9 of the buffer 518 to the host. The tape drive then performs a read-ahead operation to read up to data set 18 asynchronously with this data transfer by moving the head in preparation for succeeding read out operations. In this process, the tape drive overwrites the data sets 0 to 4 written in the segments 0 to 4 with the data sets 14 to 18 read out in this read ahead operation.

When the buffer 518 is in the state shown in FIG. 5C, if the LTFS issues a Locate request to locate the position of a record included in the data sets 5 to 9 and issues a Read request for the record, the tape drive can return the record without moving the tape. However, if the LTFS issues a Locate request to locate the position of a record included in the data sets 0 to 4 illustrated in FIG. 5B and issues a Read request for the record, the tape drive needs to rewind the tape to read the tape again because data sets 0 to 4 have been overwritten with the data sets 14 to 18.

According to various embodiments, a method, system, and computer program product provide for reading multiple files from a sequential storage media utilizing the read-ahead function of a tape drive. A first aspect performs a classifying operation. The number of records that are likely to remain in the buffer 118 without being overwritten by one read-ahead operation are calculated. Files are classified into groups on the basis of the number of likely remaining records. A second aspect performs a copying operation on a set of files. Multiple files are read from the buffer 118 in an arbitrary order without moving the tape. Advantages of the various embodiments may include faster copy operations. Specifically, multiple files may be copied in a shorter amount of time as compared with a copy operation in which the multiple files are sorted (in advance of reading the files from the tape) into an order corresponding with the position of the files on the tape. The order of the calculations for the proposed embodiments becomes O(n) as compared with O(n log n) for sorting files into an order corresponding with the position of the files on the tape.

According to various embodiments, the number of records that can be written on the segments that would not be overwritten by a read ahead operation is used as a unit, and files of this unit are classified into groups (hereinafter called "read ahead groups"). Each read ahead group includes one or more files having records of the unit. In the method descried below, the read ahead groups are scanned in order beginning with the first group. One or more of the files of each group may be read in any desired order, i.e., an arbitrary order. The approach descried below guarantees that the files in a read ahead group are able to be transferred from the buffer 118 to a host without moving the tape, even when the files are read out in an arbitrary order because the files in the read ahead group are not overwritten by a read ahead operation.

Figure 6A:
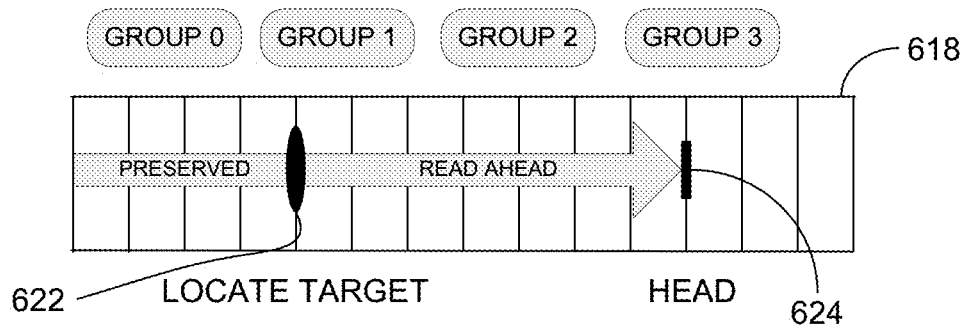
FIGS. 6A-B illustrate an example buffer in various states of operation according to various embodiments.
Figure 6B:
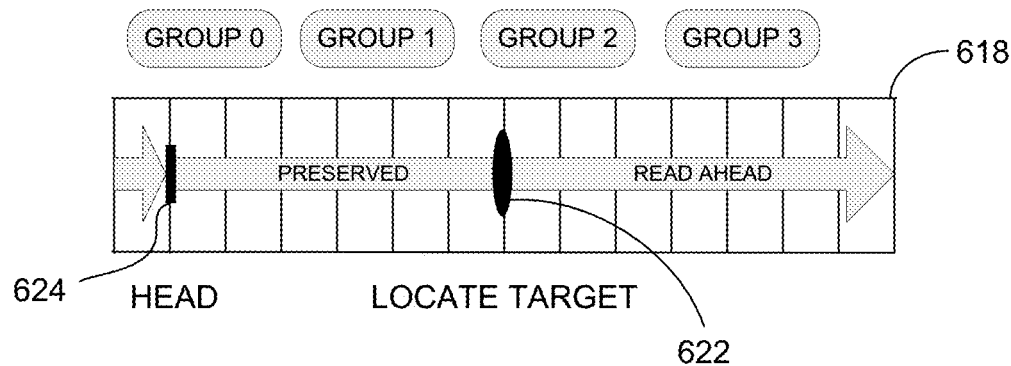

FIGS. 6A-B illustrate an example buffer 618 that has been divided into 14 segments 520, similar to the buffers 418, 518 depicted in FIGS. 4 and 5A-C. The ellipse 622 indicates the position in the buffer where the data sets read from the record specified in a Locate command are saved. The rectangle 624 indicates the position in the buffer where the first one of the data sets read by the read-ahead operation is saved.

FIG. 6A shows an example buffer 618 and groups 0, 1, 2, and 3. When a Locate operation is performed to locate the last position of the read ahead group 0, the tape drive reads out data sets from the tape up to segment 2, as shown in FIG. 6A. The data sets read from the tape are stored in the buffer 618 in the segments labeled "preserved." When the file system 104, e.g., LTFS, issues a read request for a file belonging to the read ahead group 0, the tape drive can immediately transfer the corresponding records from buffer to the host. In addition, asynchronously with the data transfer to the host, the tape drive reads ahead, by moving the tape, data sets on the tape up to segment 11 of the buffer. The data sets read from the tape in the read ahead operation are stored in the buffer 618.

When all necessary files of the read ahead group 0 have been read from the buffer, a Locate operation is performed to locate the record corresponding to the last position of the read ahead group 1 (in segment 6). Even when the LTFS locates and reads an arbitrary file in the group, the tape drive can immediately transfer the data from the buffer. The tape drive reads ahead up to the segment 0 (data sets corresponding with segments 7-13 and wrapping around to segment 0) asynchronously with that transfer operation, in preparation for succeeding data transfer operations as shown in FIG. 6B.

Figure 7:
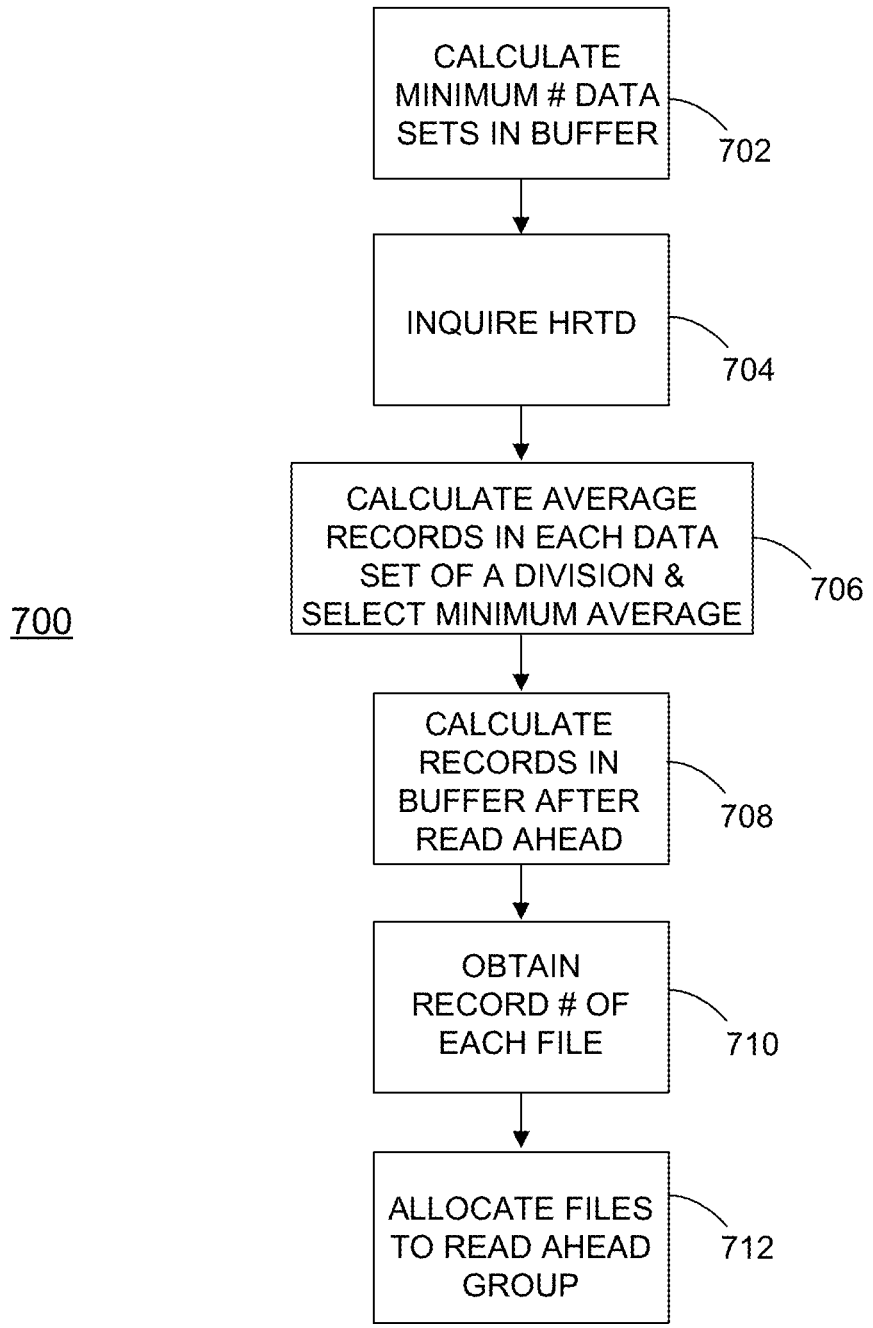
FIG. 7 illustrates a flowchart of a preparation method according to various embodiments.

FIG. 7 illustrates a flowchart of a preparation method 700. The preparation method 700 obtains in advance the number of records that are likely to remain without being overwritten in a read ahead operation. In addition, the preparation method 700 assigns files to be read to read ahead groups on the basis of the number of records.

In operation 702, the number of data sets that at least remain in the buffer 118 even after performing a read ahead operation is determined. The number of data sets are calculated on the basis of the format of the tape on which the data is written. For the case of tape used by the IBM TS1155 tape drive, the number of data sets that are not overwritten even after a read ahead operation is performed corresponds with 10 segments in the buffer 118. For the case of an LTO7 drive, the number of data sets that are not overwritten even after a read ahead operation corresponds with 16 segments in the buffer 118. The number is not limited to these two examples. The number may vary as the principles of the invention are applicable to any desired tape format.

In operation 704, information from a tape directory is obtained. For example, information regarding the number of divisions per wrap may be obtained from a tape directory. As mentioned, the High Resolution Tape Directory (HRTD) is employed in various embodiments. An HRTD divides one wrap into 128 divisions. A JD tape formatted by an IBM TS1155 tape drive has 240 wraps and thus has 30720 (128×240) divisions. Existing tape drives may not provide a mechanism for an application to access the tape directory information, e.g., an HRTD. However, there exists an interface for providing proprietary information to the tape drive, such as Dump and Cartridge Memory, via the Read Buffer command. Therefore, it is easy to provide a mechanism for accessing the HRTD information by defining a new Buffer ID.

In operation 706, the average of the number of records per data set for each HRTD division is calculated on the basis of the tape directory information, e.g., HRTD information, and the minimum average number of records is selected. It will be recalled that the number of records stored in a data set varies; the number of records stored in a data set depends on at least the compression ratio. In addition, it will be recalled that a division, in one embodiment, has 97 data sets. Further, it will be recalled that one wrap, in one embodiment, has 128 divisions. As one example, operation 706 calculates the average number of records per data set for each division in a wrap. Thus, for a division with 97 data sets, operation 706 calculates 97 values for average number of records per data set. The operation 706 then selects the lowest of those 97 values as the minimum average number of records per data set for the division. It should be noted that the last HRTD division is excluded from this calculation.

An HRTD records the number of data sets for each two divisions and records the number of records for the corresponding division. Thus, it is possible to calculate the average of the number of records included in one data set for each two divisions. This step (706) selects the minimum average number of records included in one data set. For example, when 294 data sets are included in two divisions and 5640 records are recorded therein, it means that an average of 19 records is written per one data set. However, because it is possible that the last HRTD division may not contain a sufficient number of data sets, the last division is excluded from selection.

In operation 708, the number of records that are likely to remain in the buffer after performing a read ahead operation is calculated. The number of records is calculated on the basis of the number of data sets remaining in the buffer as calculated in operation 702 and the minimum average number of records per data set calculated in operation 706. For example, if 86 data sets will remain in the buffer even after performing a read ahead operation and the minimum average number of records is 19, then at least 1634 (=86×19) records are likely to remain in the buffer.

In operation 710, the record position of each file to be copied is obtained. The record position may be obtained from the file system or the index recorded in the index partition of the tape. When using LTFS as the file system, there is a mechanism for obtaining the block number of the starting block of a file. This mechanism is the function of Virtual Extended Attribute. A block is a minimum unit for handling data of the file system. In the case of LTFS, the block number assigned to a block is the same as the number assigned to a record, which is a minimum unit of data handled by the tape drive. An alternative method for obtaining the record position is to directly read the index from the index partition of the tape and analyze the meta information to extract the block number of the block to which the file belongs.

In operation 712, for each file, the record position of the file is divided by the number of records as calculated in operation 708. The result of the division operation is quotient. Each file is classified into a group based on the quotient. Files that have the same quotients are classified into the same group. (It should be understood that "quotient" is used here to refer to the integer part of the result of a division operation.) These groups are called read ahead groups. Operation 712 calculates the quotient by dividing the block (record) number of the starting block of each file by the number of records calculated in the calculate records in buffer after read operation, and records the name of the file on a file list of a group having the quotient as the index of the group. For example, assume that 100 records are likely to remain in the buffer in operation 708. The record number of the first record of file X is 1234. For file X, the quotient is 12. (1234/100=12, remainder: 34.) The record number of the first record of file Y is 2345. For file Y, the quotient is 23. (2345/100=23, remainder: 45.) The record number of the first record of file Z is 1212. For file Z, the quotient is 12. (1212/100=12, remainder: 12.) Because files X and Z have the same quotient, they are classified into the same group, e.g., read ahead group 12. File Y is classified into read ahead group 23. As the determination as to which group the file belongs is made by only one division, it takes only a calculation amount of the order of O(n).

FIGS. 3A and 3B illustrate a simple example of reading four files A, B, C, D. FIG. 3A shows reading the files in an order: A, B, C, D. FIG. 3B shows reading these files a sorted order: D, C, B, A. This simple example may be extended to illustrate the principles of the invention. For example, assume the quotients for files C and D are be the same, e.g., 1. Files C and D are classified to read ahead group 1. Assume the quotient for file A is 7 and the quotient for file B is 3. File A may be classified to read ahead group 7. File B may be classified to read ahead group 3.

Figure 8:
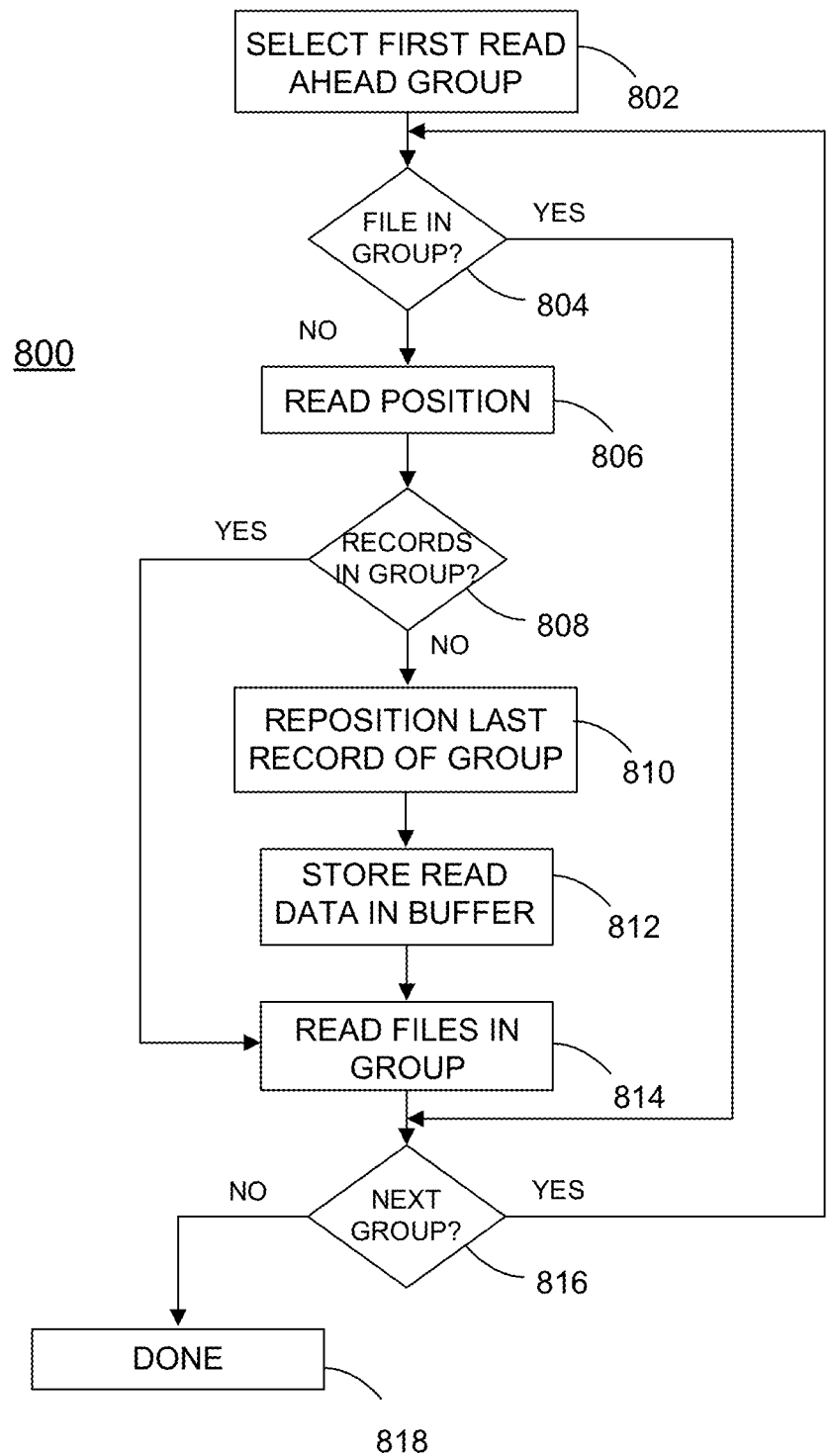
FIG. 8 illustrates a flowchart of a method for reading sets of files divided into groups by the preparation method.

FIG. 8 illustrates a flowchart of a method 800 for reading sets of files divided into groups by the preparation method 700. The method 800 starts with a first group and processes each subsequent group in order.

In operation 802, the first one of the read ahead groups (that were created on the basis of record size unit) is selected.

In operation 804, if there is no file included in the read ahead group, proceed to 816. Otherwise, proceed to 806.

In operation 806, one or more Read Position commands are issued to obtain the range of records that have been stored in the buffer. The information obtained as a result of the Read Position commands includes the starting position to the end position of the records stored in the buffer.

Operation 808 checks whether the records of the selected read ahead group are included in the range of the records stored in the buffer, which is obtained in operation 806. Specifically, the largest record number of the records included in the read ahead group is obtained by multiplying the index of the read ahead group by the number of records per group. When the current buffer includes a record with this largest record number, the step proceeds to 814 because there is no need of reading data again. In other words, when the records of the selected read ahead group from the starting record to the last record thereof have been read out to the buffer, the method 800 proceeds to 814. Otherwise, the method proceeds to 810.

In operation 810, a Locate command is issued. The Locate command specifies the largest record number of the records included in the read ahead group, which has been calculated in 808. The Locate command is necessary because a record of a file belonging to the group to be read is not stored in the buffer. The Locate command moves the tape to the last position of the selected group.

In operation 812, the tape drive moves the head to the specified position, starts reading data, and saves the data read ahead to the buffer. Upon receiving the Locate command, the tape drive repositions the head to the specified record position, reads ahead data of a necessary number of data sets by the reading ahead function, and stores the read data to the buffer. In this process, at least the first record of the selected read ahead group remains on the buffer without being overwritten.

In operation 814, files included in the read ahead group are read (and transferred to the host) in an arbitrary order. As the records of the files included in the read ahead group are all stored in the buffer, the tape drive can transfer data from buffer to the host without moving the tape.

Operation 816 selects the next read ahead group and proceeds to 804, unless no groups remain in which case the method 800 ends at 818.

Regarding an Extent or Record Crossing a Boundary between Groups. The procedure of the present invention is premised that one file is constituted by one Extent. Actually, a file may possibly be edited to be constituted by multiple Extents or one Extent may possibly cross a boundary between multiple read ahead groups. In the former case, a portion of the file can be fixed in a sparse file or the like and the file can be complemented by filling the sparse portion when the remaining Extent has been read out. In the latter case, the Extent may be divided at the record position on a boundary of the read ahead groups and then the same processing as the former can be performed.

Amount of Calculation for Classifying Files to be Copied. Assuming that the number of files written on the tape is N, the amount of calculation by the conventional mechanism that sorts the order of all the files in the order of the record numbers of the files is of the order of O(N log N). In contrast, the amount of calculation for classifying N files by record numbers thereof into read ahead groups in advance is of the order of O(N). As N is increased, the difference between O(N log N) and O(N) increases, meaning that the difference in the amount of calculation increases. Thus, it is understood that the present method sufficiently reduces the amount of calculation compared to the conventional mechanism.

Number of Files to be Copied. The proposed mechanism reads data in order from the beginning of the tape by utilizing the read ahead function that is performed when locating a position on the tape. Thus, a great effect can be expected when performing a Reclaim command of LTFS EE or when reading the whole data of a tape. In addition, even when the number of the files to be read is small, the method does not access divisions where a file to be read does not exist. Thus, the method does not need to perform fruitless operations and thus provides advantageous effects.

Figure 9:
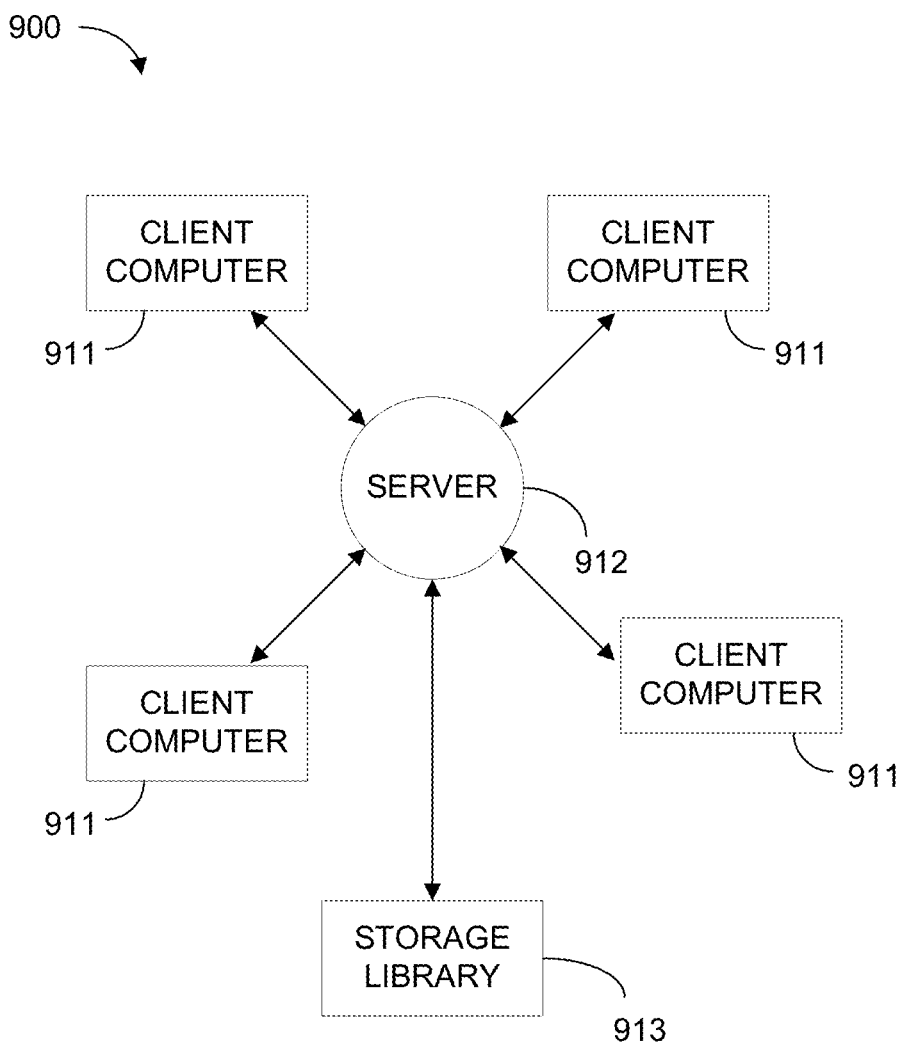
FIG. 9 is a block diagram illustrating a client-server library system in which aspects of the invention may be implemented.

FIG. 9 is a block diagram illustrating a client-server library system in which aspects of the various embodiments of the invention may be implemented. The system 900 includes multiple client computers 911 from which data is transmitted to a server 912 for archiving in a data storage library or tape library 913. The client computers 911 also retrieve previously archived data from the library 913 through the server 912. Client computers 911 may be personal computers, portable devices (e.g., PDAs), workstations, or server systems. The client computers 911 may be connected to the server 912 through a local area network such as an Ethernet network, or by SCSI, iSCSI, Fibre Channel, Fibre Channel over Ethernet, or Infiniband. Similarly, the data storage library 913 may be connected to the server 912 using a high data rate connection such as an optical or copper fiber channel, SCSI, iSCSI, Ethernet, Fibre Channel over Ethernet or Infiniband.

Figure 10:
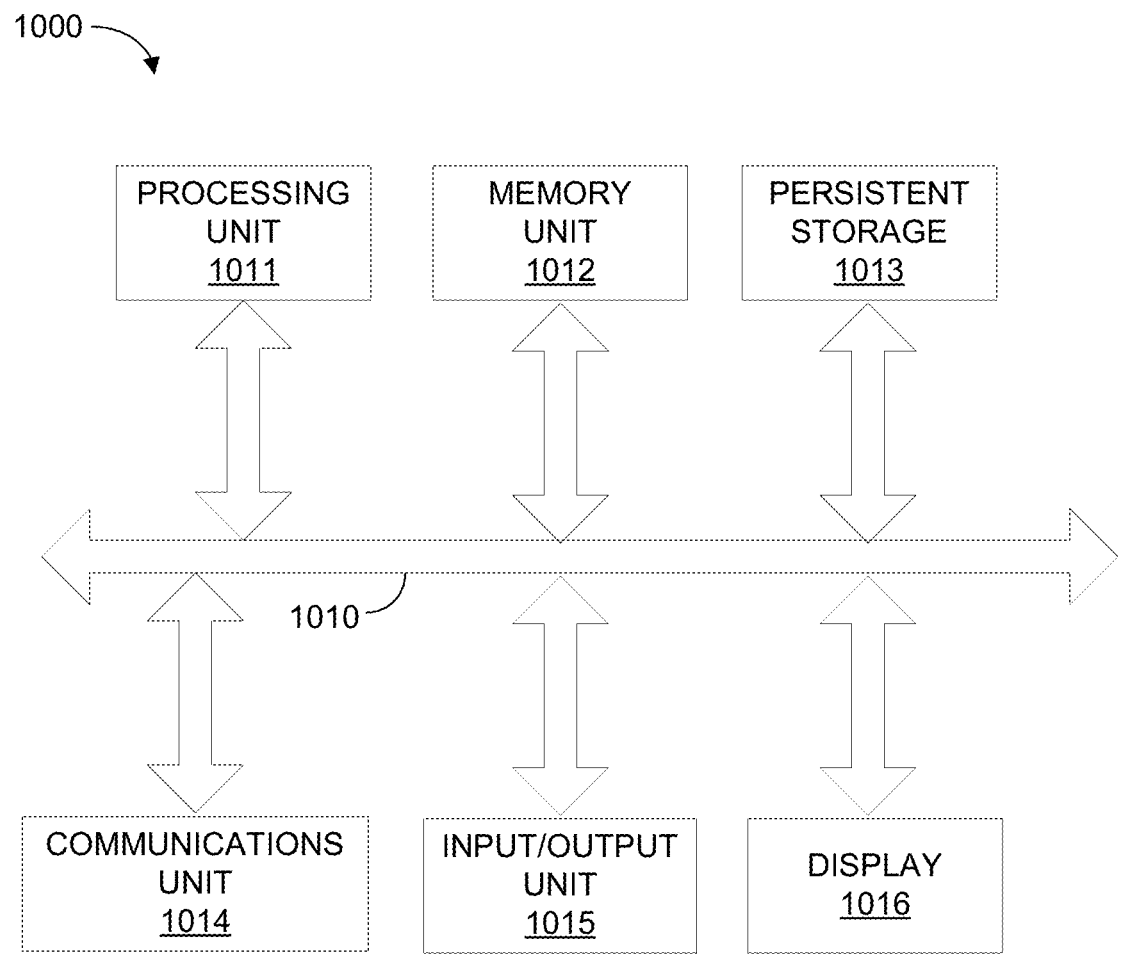
FIG. 10 is a block diagram illustrating a computer system which may be used as a client, server, or host computer according to various embodiments.

FIG. 10 is a block diagram illustrating a computer system which may be used as a client, server, or host computer according to various embodiments. As shown, a computer system 1000 includes a processor unit 1011, a memory unit 1012, a persistent storage 1013, a communications unit 1014, an input/output unit 1015, a display 1016 and a system bus 1010. Computer programs are typically stored in the persistent storage 1013 until they are needed for execution, at which time the programs are brought into the memory unit 1012 so that they can be directly accessed by the processor unit 1011. The processor unit 1011 selects a part of memory unit 1012 to read and/or write by using an address that the processor 1011 gives to memory 1012 along with a request to read and/or write. Usually, the reading and interpretation of an encoded instruction at an address causes the processor 1011 to fetch a subsequent instruction, either at a subsequent address or some other address. The processor unit 1011, memory unit 1012, persistent storage 1013, communications unit 1014, input/output unit 1015, and display 1016 interface with each other through the system bus 1010.

The tape library 1113 may be an automated tape library that accommodates multiple tape drives for reading and writing on tape media, such as single-reel or two-reel magnetic tape cartridges. Examples of the library 1113 include IBM TS3400 and TS3500 tape libraries, IBM TotalStorage 3494 Tape Libraries, and IBM 3952 tape Frames model C20, which store magnetic tape cartridges and use IBM TS1130 tape drives. Other examples of the library 1113 include IBM TS3310 and TS3100/3200 tape libraries which store magnetic tape cartridges and use IBM LTO (Linear Tape Open) tape drives. A plurality of tape media may be stored in banks or groups of storage slots in tape library 1113. Tape media may encompass a variety of media, such as that contained in magnetic tape cartridges, magnetic tape cassettes, and optical tape cartridges, in various formats. For universal reference to any of these types of media, the terms "tape media" or "media" are used herein, and any of these types of containers are referred to as "tape cartridges" or "cartridges" herein. The tape library 1113 may include an access robot, including a cartridge picker and a bar code reader mounted on the picker that transports a selected cartridge between a storage slot and a drive.

The tape library 1113 further has a library controller which includes at least one microprocessor and other components depicted in computer system 1000. The library controller may serve to provide an inventory of the cartridges and to control the library. Typically, the library controller has suitable memory and data storage capability to control the operation of the library. The library controller controls the actions of the access robot, cartridge picker, and bar code reader. In various embodiments, the library controller may execute instructions and issue commands for moving a read head during a read recovery operation. The library controller is interconnected through an interface to one or more host processors, which provides commands requesting access to particular tape media or to media in particular storage slots. A host, either directly, or through the library controller, controls the actions of the data storage drives. Commands for accessing data or locations on the tape media and information to be recorded on, or to be read from, selected tape media are transmitted between the drives and the host. The library controller is typically provided with a database for locating the tape cartridges in the appropriate storage slots and for maintaining the cartridge inventory.

In various embodiments, tape media may be stored in a tape cartridge, which may be referred to as a single-reel cartridge as it includes only one tape reel which acts as a supply reel during operation. A take-up reel is provided in the tape drive for receiving the tape media when the tape media is being unspooled from the tape reel. In a different design of the tape drive, a take-up reel might be included in the cartridge itself rather than in the tape drive. Such a tape cartridge is referred to as a dual-reel cartridge.

Figure 11:
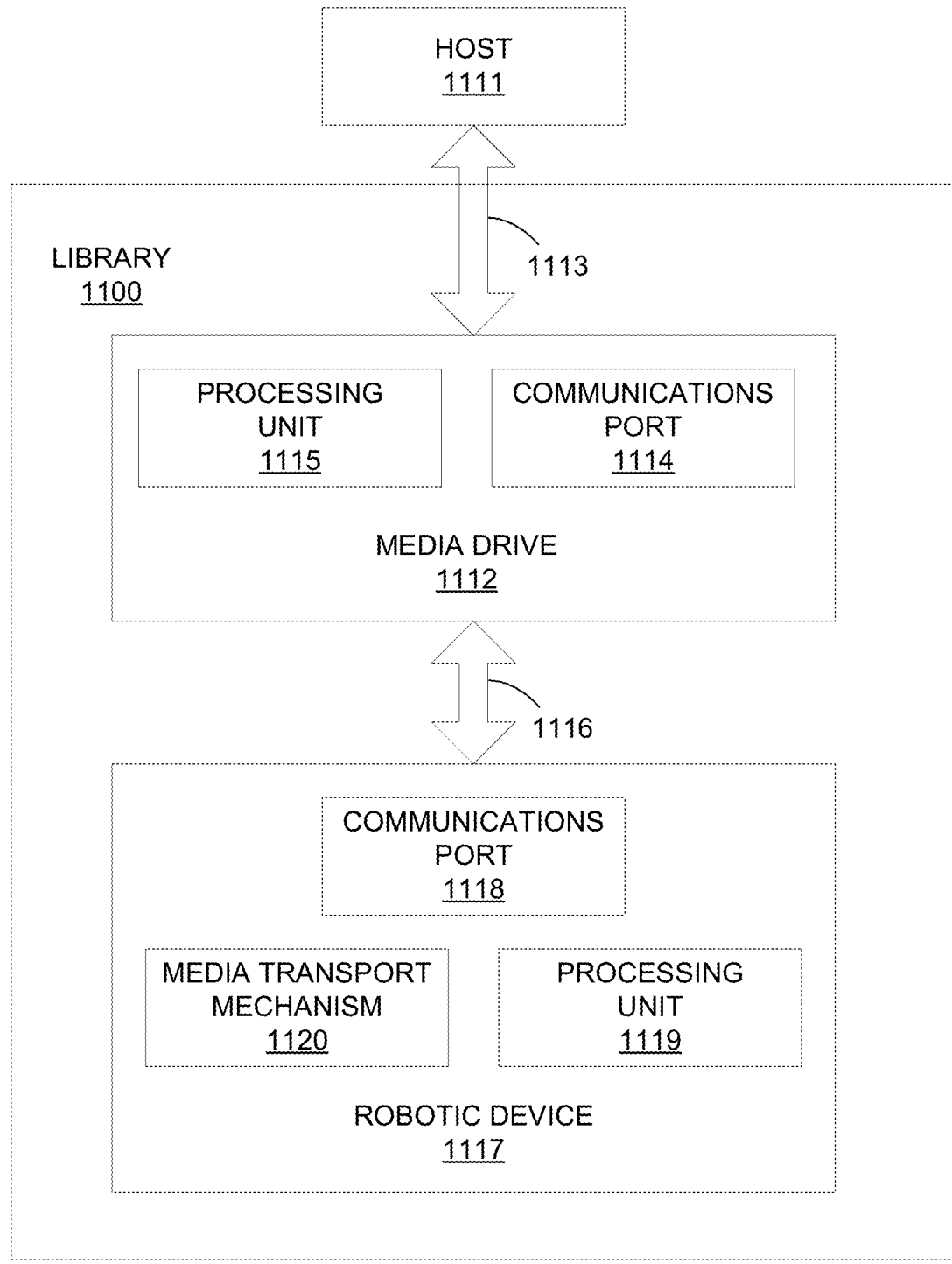
FIG. 11 illustrates a block diagram showing an exemplary data storage tape library in communication with a host computer according to various embodiments.

FIG. 11 illustrates a block diagram showing an exemplary data storage tape library in communication with a host computer according to various embodiments. FIG. 11 shows the functional components of an exemplary data storage tape library 1100 in communication with a host computer 1111 for providing aspects of the invention. The library 1100 is attached to a host 1111, and includes a media drive 1112 and a robotic device 1117. Data and control path 1113 interconnects the host 1111 and drive 1112. Similarly, data and control path 1116 interconnects the drive 1112 and the robotic device 1117. The paths 1113 and 1116 may comprise suitable means for conveying signals, such as a bus with one or more conductive members (such as wires, conductive traces, cables, etc.), wireless communications (such as radio frequency or other electromagnetic signals, infrared communications, etc.), and fiber optic communications. Furthermore, the paths 1113 and 1116 may employ serial, parallel, or another communications format, using digital or analog signals as desired. Communications with the media drive 1112 and robotic device 1117 are through communications ports 1114 and 1118, respectively.

Both the drive 1112 and the robotic device 1117 may include respective processing units 1115 and 1119, e.g., CPUs, processors, controllers. The library 1100 manages the positioning and access of removable or portable data storage media such as magnetic tape, cartridge 400, optical tape, optical disk, removable magnetic disk drive, CD-ROM, digital video disk (DVD), flash memory, or another appropriate format. Some of these types of storage media may be self-contained within a portable container, or cartridge. For universal reference to any of these types of storage media, this disclosure refers to them as media.

The host 1111 may be a server, workstation, personal computer, or other means for exchanging data and control signals with the media drive 1112. The drive 1112 comprises a machine for reading data from and/or writing data to exchanging data with a portable data storage media. The robotic device 1117 includes the processing unit 1119 and a media transport mechanism 1120 coupled to processing unit 1119. The media transport mechanism 1120 includes servos, motors, arms, grippers, sensors and other robotic, mechanical and electrical equipment to perform functions that include (at least) the transportation of media items between the drive 1112, various storage bins (not shown), import/export slots, etc. The mechanism 1120 may, for example, comprise an auto-loader mounted to the drive 1112, a robotic arm housed inside a mass storage library, or another suitable device. As an example, the mechanism 1120 may comprise an access robot, cartridge picker and bar code reader.

Aspects of the present disclosure may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for reading a plurality of files stored on a magnetic tape having at least one wrap for storing one or more data sets, each data set including one or more records, comprising:
   determining a number of data sets that will remain in a buffer memory after performing a read ahead operation;
   determining a number of records that are likely to remain in the buffer memory after performing a read ahead operation;
   for each record likely to remain in the buffer memory after performing a read ahead operation, determining positions of the records on the magnetic tape; and
   classifying each file of the plurality of files into one group of a plurality of groups based on a position of a record corresponding with each respective file and the number of records that are likely to remain in the buffer memory after performing a read ahead operation.

2. The method of claim 1, wherein the determining a number of records that are likely to remain in the buffer memory after performing a read ahead operation further comprises:
   calculating an average of the number of records per data set for a plurality of data sets;
   selecting a minimum average number of records per data set, wherein the minimum average number is a minimum of the average of the number of records per data set for the plurality of data sets; and
   multiplying the minimum average number of records per data set by the number of data sets determined to remain in the buffer memory after performing a read ahead operation by the determined number of data sets that will remain in a buffer memory after performing a read ahead operation.

3. The method of claim 1, wherein the classifying each file of the plurality of files into one group of a plurality of groups based on a position of a record corresponding with each respective file and the number of records that are likely to remain in the buffer memory after performing a read ahead operation further comprises:
   for each record likely to remain in the buffer memory after performing a read ahead operation, determining the positions of the records on the magnetic tape:
      obtaining a quotient by dividing the determined record position of the file by the determined number of records that are likely to remain in the buffer memory after performing a read ahead operation; and
      classifying the file into a group based on the quotient.

4. The method of claim 1, storing a plurality of data sets in the buffer memory during a read ahead operation.

5. The method of claim 1, storing a plurality of data sets in the buffer memory during a read ahead operation.

6. The method of claim 1, wherein the method further comprises:
   performing, subsequent to the classifying each file of the plurality of files into one group of a plurality of groups, a locate operation to reposition a head of a tape drive to a position where a first group to which a first file of the plurality of files is assigned and reading out records of a number of records of the first group; and
   moving, subsequent to the performing of the locate operation, the head of the tape drive on the tape to read records of a number of records to be read ahead for storage in the buffer memory.

7. The method of claim 6, further comprising:
   obtaining a number of divisions per wrap from a tape directory.

8. The method of claim 1, further comprising:
   reading out one or more files included in the first group in an arbitrary order.

9. A tape library system capable of reading a plurality of files stored on a magnetic tape having at least one wrap for storing one or more data sets, each data set including one or more records, the tape library system comprising:
   a tape drive;
   a buffer memory associated with the tape drive; and
   a processing device for executing program instructions stored in memory, wherein the processing device performs operations to perform a method comp S determining a number of data sets that will remain in a buffer memory after performing a read ahead operation;
   determining a number of records that are likely to remain in the buffer memory after performing a read ahead operation;
   for each record likely to remain in the buffer memory after performing a read ahead operation, determining positions of the records on the magnetic tape; and
   classifying each file of the plurality of files into one group of a plurality of groups based on a position of a record corresponding with each respective file and the number of records that are likely to remain in the buffer memory after performing a read ahead operation.

10. The tape library system of claim 9, wherein the determining a number of records that are likely to remain in the buffer memory after performing a read ahead operation further comprises:
    calculating an average of the number of records per data set for a plurality of data sets;
    selecting a minimum average number of records per data set, wherein the minimum average number is a minimum of the average of the number of records per data set for the plurality of data sets; and
    multiplying the minimum average number of records per data set by the number of data sets determined to remain in the buffer memory after performing a read ahead operation by the determined number of data sets that will remain in a buffer memory after performing a read ahead operation.

11. The tape library system of claim 9, wherein the classifying each file of the plurality of files into one group of a plurality of groups based on a position of a record corresponding with each respective file and the number of records that are likely to remain in the buffer memory after performing a read ahead operation further comprises:
    for each record likely to remain in the buffer memory after performing a read ahead operation, determining the positions of the records on the magnetic tape:
    obtaining a quotient by dividing the determined record position of the file by the determined number of records that are likely to remain in the buffer memory after performing a read ahead operation; and
    classifying the file into a group based on the quotient.

12. The tape library system of claim 9, storing a plurality of data sets in the buffer memory during a read ahead operation.

13. The tape library system of claim 9, storing a plurality of data sets in the buffer memory during a read ahead operation.

14. A computer program product for reading a plurality of files stored on a magnetic tape having at least one wrap for storing one or more data sets, each data set including one or more records, the computer program product comprising one or more non-transitory computer readable storage media, and program instructions collectively stored on the one or more non-transitory computer readable storage media, the program instructions executable by processing logic in a tape library to cause a processor to perform a method, comprising:
    determining a number of data sets that will remain in a buffer memory after performing a read ahead operation;
    determining a number of records that are likely to remain in the buffer memory after performing a read ahead operation;
    for each record likely to remain in the buffer memory after performing a read ahead operation,
    determining positions of the records on the magnetic tape; and
    classifying each file of the plurality of files into one group of a plurality of groups based on a position of a record corresponding with each respective file and the number of records that are likely to remain in the buffer memory after performing a read ahead operation.

15. The computer program product of claim 14, wherein the determining a number of records that are likely to remain in the buffer memory after performing a read ahead operation further comprises:
    calculating an average of the number of records per data set for a plurality of data sets;
    selecting a minimum average number of records per data set, wherein the minimum average number is a minimum of the average of the number of records per data set for the plurality of data sets; and
    multiplying the minimum average number of records per data set by the number of data sets determined to remain in the buffer memory after performing a read ahead operation by the determined number of data sets that will remain in a buffer memory after performing a read ahead operation.

16. The computer program product of claim 14, wherein the classifying each file of the plurality of files into one group of a plurality of groups based on a position of a record corresponding with each respective file and the number of records that are likely to remain in the buffer memory after performing a read ahead operation further comprises:
    for each record likely to remain in the buffer memory after performing a read ahead operation, determining the positions of the records on the magnetic tape:
    obtaining a quotient by dividing the determined record position of the file by the determined number of records that are likely to remain in the buffer memory after performing a read ahead operation; and
    classifying the file into a group based on the quotient.

17. The computer program product of claim 14, storing a plurality of data sets in the buffer memory during a read ahead operation.

18. The computer program product of claim 14, storing a plurality of data sets in the buffer memory during a read ahead operation.

19. The computer program product of claim 14, wherein the method further comprises:
- performing, subsequent to the classifying each file of the plurality of files into one group of a plurality of groups, a locate operation to reposition a head of a tape drive to a position where a first group to which a first file of the plurality of files is assigned and reading out records of a number of records of the first group; and
- moving, subsequent to the performing of the locate operation, the head of the tape drive on the tape to read records of a number of records to be read ahead for storage in the buffer memory.

20. The computer program product of claim 19, further comprising:
- reading out one or more files included in the first group in an arbitrary order.

* * * * *